United States Patent
Pokharel et al.

(10) Patent No.: US 8,824,079 B2
(45) Date of Patent: Sep. 2, 2014

(54) SERVO PATTERNS FOR BIT PATTERNED MEDIA WITH MULTIPLE DOTS PER SERVO PERIOD

(75) Inventors: Puskal Prasad Pokharel, Bloomington, MN (US); Mustafa Can Ozturk, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 1185 days.

(21) Appl. No.: 12/336,992

(22) Filed: Dec. 17, 2008

(65) Prior Publication Data

US 2010/0067145 A1 Mar. 18, 2010

Related U.S. Application Data

(63) Continuation-in-part of application No. 12/233,928, filed on Sep. 19, 2008, and a continuation-in-part of application No. 12/210,681, filed on Sep. 15, 2008.

(51) Int. Cl.

| | |
|---|---|
| *G11B 5/09* | (2006.01) |
| *G11B 5/596* | (2006.01) |
| *G11B 5/74* | (2006.01) |
| *B82Y 10/00* | (2011.01) |
| *G11B 5/82* | (2006.01) |

(52) U.S. Cl.
CPC *G11B 5/82* (2013.01); *G11B 5/743* (2013.01); *G11B 5/59688* (2013.01); *B82Y 10/00* (2013.01)
USPC .......................................... 360/48; 360/77.08

(58) Field of Classification Search
None
See application file for complete search history.

(56) References Cited

U.S. PATENT DOCUMENTS

| | | | |
|---|---|---|---|
| 4,549,232 A | 10/1985 | Axmear et al. | |
| 4,912,576 A | 3/1990 | Janz | |
| 5,420,730 A | 5/1995 | Moon et al. | |
| 5,473,480 A * | 12/1995 | Ishida | 360/51 |
| 5,615,065 A | 3/1997 | Cheung | |
| 6,049,438 A | 4/2000 | Serrano et al. | |
| 6,304,398 B1 | 10/2001 | Gaub et al. | |
| 6,529,341 B1 * | 3/2003 | Ishida et al. | 360/48 |
| 6,628,598 B2 * | 9/2003 | Edwards et al. | 369/99 |
| 6,775,081 B2 | 8/2004 | Ottesen et al. | |
| 6,999,279 B2 * | 2/2006 | Lundstrom | 360/131 |
| 7,119,975 B2 | 10/2006 | Blaum et al. | |
| 7,167,329 B2 | 1/2007 | Baker | |
| 7,307,807 B1 | 12/2007 | Han et al. | |
| 7,365,933 B2 | 4/2008 | Hamaguchi et al. | |
| 7,443,622 B2 * | 10/2008 | Kaizu et al. | 360/15 |
| 7,443,626 B2 * | 10/2008 | Asakura et al. | 360/64 |
| 7,492,540 B2 * | 2/2009 | Albrecht | 360/51 |
| 2006/0215310 A1 | 9/2006 | Zayas | |
| 2007/0258161 A1 | 11/2007 | Richter et al. | |
| 2007/0281078 A1 | 12/2007 | Kikitsu et al. | |

* cited by examiner

*Primary Examiner* — K. Wong
(74) *Attorney, Agent, or Firm* — HolzerIPLaw, PC

(57) ABSTRACT

A servo control field on a recordable medium includes a bit patterned media (BPM) pattern including a plurality of dots arranged in a down-track orientation and in a cross-track orientation, wherein the dots comprise a plurality of dot composites. Each of the dot composites includes a plurality of dots. A first spacing between adjacent ones of the plurality of dots in a dot composite in the down-track direction on the recordable medium is less than a second spacing between adjacent ones of the plurality of dot composites in the down-track direction. A readback signal generated in response to the BPM patterned may be filtered to attenuate harmonic frequencies in the readback signal.

20 Claims, 12 Drawing Sheets

SERVO PATTERNS FOR BIT PATTERNED MEDIA WITH MULTIPLE DOTS PER SERVO PERIOD

CROSS-REFERENCE TO RELATED APPLICATIONS

The present application is a continuation-in-part of U.S. patent application Ser. No. 12/210,681, entitled "PHASE SERVO PATTERNS FOR BIT PATTERNED MEDIA," filed on Sep. 15, 2008, and a continuation-in-part of U.S. patent application Ser. No. 12/233,928, entitled "AN ENCODING SCHEME FOR BIT PATTERNED MEDIA," filed on Sep. 19, 2008, the disclosures of which are incorporated herein by reference.

BACKGROUND

The present invention relates to data storage media and devices, and more particularly to data storage devices including magnetic bit patterned media.

In conventional magnetic data storage media, data bits are recorded using magnetic transitions on a magnetic recording layer that is composed of a random arrangement of single-domain particles. That is, the magnetic recording layer is typically a thin film of a magnetic material that includes a random arrangement of nanometer-scale grains, each of which behaves as an independent magnetic element. Each recorded bit is made up of many (50-100) of these random grains.

A stream of data bits is recorded as regions of opposite magnetization on the magnetic recording layer. As recorded on the medium, the stream of bits generally consists of equally spaced bit cells, with a digital '1' being indicated by a boundary (called a magnetic transition) between regions of opposite magnetization within a bit cell, and a '0' being indicated by a continuous region without such a boundary. The boundaries between regions of opposite magnetization occur along the boundaries between the grains. Because the magnetic transitions follow the grain boundaries, the transitions are typically not made along straight lines.

Thus, due to the granular nature of the recording layer, the transitions may not be placed exactly where they are intended. Any deviations in grain boundaries represent medium noise, which limits the density of data that can be recorded on the medium.

If the grains are small enough, the magnetic transitions may be straight enough that it is easy to detect which bit cells contain a boundary and which do not. However, if the recording density is increased for a given grain size, the magnetic transitions become proportionally noisier, reducing the ability of the system to accurately recover the data.

One way to reduce the medium noise is to reduce the grain size. However, due to the superparamagnetic effect, the grain size has a physical lower limit. The superparamagnetic effect refers to the tendency of a grain's magnetization to reverse when the product of the grain volume and its anisotropy energy fall below a certain value. That is, as the grain volume decreases, the magnetization of the grain can become unstable.

An alternative to conventional magnetic recording approaches is to use a bit patterned media (BPM) technique. In bit patterned media, the bits do not contain as many grains as those in conventional media. Instead, bit patterned media comprise arrays of magnetic islands which are defined on a nonmagnetic disk surface during manufacturing. The magnetic islands can be magnetized to a desired polarity one at a time by a magnetic field generated by a write head passing over the islands. The magnetic islands (referred to herein as "dots") are physically separated from each other by regions of non-magnetic material. These nonmagnetic regions are referred to herein as "gaps" or "spaces." Thus, the magnetic field generated by a write head in response to a write current can only change the magnetization of the dots, while the gaps remain unmagnetized. The magnetic islands can be formed, for example, through lithography when the disk is manufactured.

Each island, or transition between islands, may represent one bit of information. For example, a positive polarity may represent a data '1', while a negative polarity represents a data '0.' Alternatively, a transition from an island having a first polarity to an adjacent island having a different polarity may represent a data '1', while a transition from an island having a first polarity to an adjacent island having the same polarity may represent a data '0.' The signal-to-noise ratio of a bit patterned medium is determined by variations in the spacing and sizing of islands, and can be improved considerably beyond that of conventional media recording schemes.

FIG. 1A is a simplified diagrammatic representation of a top view of a disk 34 having a surface 36 which has been formatted to be used in conjunction with a sectored servo system (also known as an embedded servo system). Data is stored on the disks 34 within a number of concentric tracks (or cylinders, in the case of a multi-disk stack) 40a-h on the disk surface 36. Each track 40a-h is divided into a plurality of sectors 42 separated by radially extending spokes 43. Each sector 42 is further divided into a servo sector 42a and a data sector 42b. The servo sectors of the disk 34 are used, among other things, to accurately position the read/write head so that data can be properly written onto and read from the disk 34. The data sectors 42b are where non-servo related data (i.e., host device data) is stored and retrieved. Although FIG. 1A only shows a relatively small number of tracks for ease of illustration, it should be appreciated that typically tens of thousands of tracks are included on the surface 36 of a disk 34.

The servo sectors 42a in each track 40 are radially aligned with servo sectors 42a in the other tracks, thereby forming servo wedges 45 which extend radially across the disk 34 (e.g., from the disk's inner diameter 44 to its outer diameter 46).

FIG. 1B is a view of a track 40 including sectors 42, each of which includes a servo sector 42a and a data sector 42b, from the frame of reference of a read/write head of the disk drive. The cross-track direction (i.e., moving from the inner diameter ID of a disk to the outer diameter OD, or vice-versa) is perpendicular to the track 40, while the down-track direction is parallel to the track 40.

FIG. 1C illustrates exemplary servo information 80 that may be stored in at least some of the servo sectors 42a within the radial sectors 42. The servo information 80 can include various servo control fields, such as a preamble field 82, a servo address mark (SAM) field 84, a track ID field indicated by its least significant bits (LSBs) 86, a spoke number field 88, an entire track ID field 90 which may be recorded in at least one of the servo spokes, and a servo burst field 92 of circumferentially staggered radially offset servo bursts (e.g., A, B, C, D servo bursts).

FIG. 1D illustrates a BPM configuration including a regular array of rows 13 of patterned magnetic islands (i.e. dots) 25 on a disk surface 15. In the data sector 42b of a disk track 42, a write head can be moved along a row 13 of islands 25 and switched or pulsed with electric current to cause the desired recording of data by magnetizing each island to a desired polarization (e.g. a positive or negative polarization).

SUMMARY

A servo control field on a recordable medium includes a bit patterned media (BPM) pattern including a plurality of dots arranged in a down-track orientation and in a cross-track orientation, wherein the dots comprise a plurality of dot composites. Each of the dot composites includes one or more dots and associated spaces (gaps). A first spacing between adjacent ones of a plurality of dots in a dot composite in the down-track direction on the recordable medium is less than a second spacing between adjacent ones of the plurality of dot composites in the down-track direction.

A readback signal generated in response to the BPM patterned may be filtered to attenuate harmonic frequencies in the readback signal.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1A:
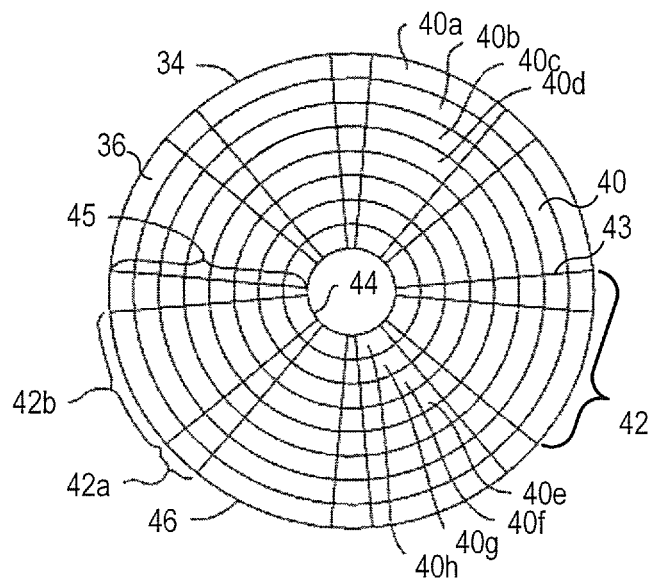
FIGS. 1A and 1B illustrates a layout of a disk surface.
Figure 1B:
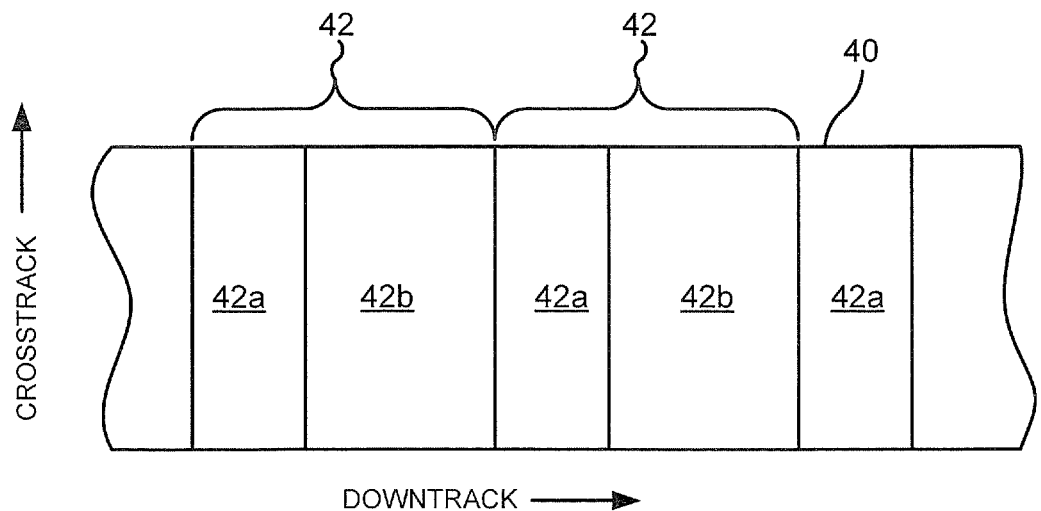

Various embodiments will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that positions a sensor responsive to servo control bursts on a movable medium.

As noted above, a disk track includes data sectors and servo sectors. In a disk using a Bit Patterned Media (BPM) recording scheme having a pattern of magnetic islands, or dots, on the disk surface, data is stored in the data sectors by selectively magnetizing the dots in a desired pattern. In contrast to data sectors, information in the servo sectors may be defined at the time of disk manufacture. Moreover, rather than being encoded in magnetic transitions from dot to dot, information in the servo sectors can be encoded by the physical arrangement of dots and gaps on the disk surface. That is, servo information can be encoded in the spacing and/or sizing of dots on the disk surface. As such information may be independent of magnetic polarity, all dots in the servo sectors may be DC erased, or set to a single polarity by a DC field. However, in some embodiments, the dots may be polarized using a writing head according to a predetermined rule to generate other types of readback signals.

Encoding servo information in the physical arrangement of dots in the servo sectors can provide for timing-based servo control. Timing based servo patterns may provide benefits, such as better linearity characteristics, compensation for timing acquisition errors, and/or robustness to cross-track amplitude variation, particularly as the dot density increases. Hence, the design of such patterns may prove beneficial to support BPM technology for higher areal density targets.

Figure 2:
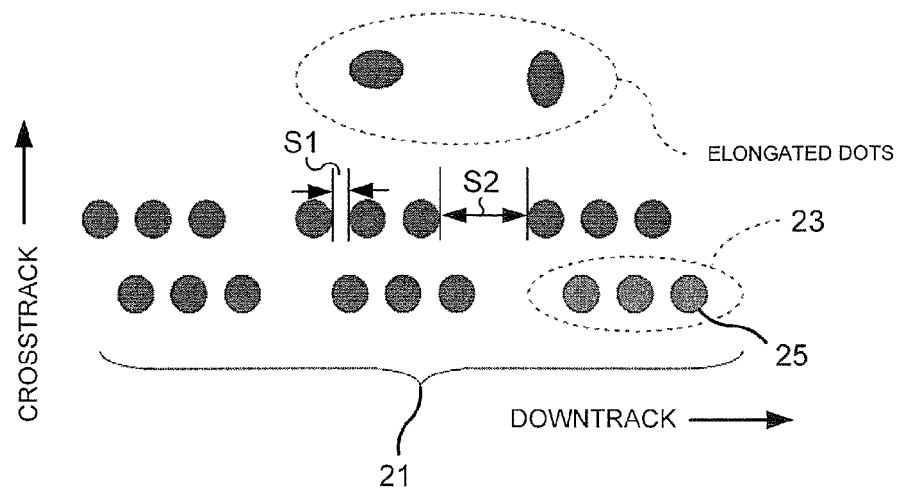
FIG. 2 illustrates BPM patterns according to some embodiments.

According to some embodiments, a timing based servo pattern for BPM includes collections of dots, referred to herein as a "dot composites," that are arranged periodically in crosstrack and downtrack directions on a disk surface to form a servo burst pattern. The dots in a dot composite may or may not be separated from one another. For example, FIG. 2 illustrates a BPM pattern 21 including a plurality of dot composites 23, each of which includes three dots 25 arranged in a single row in the downtrack direction. A spacing S1 between adjacent dots 25 in a dot composite 23 is smaller than a spacing S2 between adjacent dot composites 23. In some cases, the spacing between adjacent dots 25 in a dot composite 23 is zero (i.e. the dots may be touching).

By using dot composites instead of simply using dots, the amplitude of the readback signal may be increased. Furthermore, using dot composites may beneficially lower the frequency of the readback signal to meet the requirements of the demodulator circuit (i.e. the circuit that processes the readback signal).

As further illustrated in FIG. 2, the dots 25 may be elongated in either a down-track or cross-track direction. That is, an aspect ratio of the dots 25 (defined as the ratio of the largest dimension to the smallest dimension of a dot) may change. The aspect ratio of the dots may be changed in a cross-track and/or down-track direction. Changing the aspect ratio of the dots may increase the amplitude of the readback signal. Furthermore, the width of the dot composites 23 may be increased in a cross-track direction from an inner diameter to an outer diameter of the disc to maintain a constant servo frequency for all tracks.

In bit patterned media, as the recording density increases and the size of the dots becomes smaller, the peak to peak amplitude of the readback signal of DC-erased servo patterns is reduced. One reason for this is that the readback signal will not reach a minimum value of zero between adjacent dots, because the read channel parameters cannot be scaled down appropriately as the dot density increases. This reduces the effective signal to noise ratio (SNR) of the readback signal, and decreases the overall servo performance.

To accommodate demodulator circuits currently in use in disc drives, the servo frequency is preferably lower than the data frequency. This can be accomplished by simply increasing the spacing between adjacent dots in the servo sectors. However, such an approach may be problematic for digital detection, due to the uneven duty cycle that results. Another approach to reduce servo frequency is to employ one dot per preamble cycle. However, if the servo frequency is to be kept the same, the dot patterns must be elongated by a substantial amount in the downtrack direction from the inner to the outer diameter of the disc. Increasing the dot aspect ratio by elongating the dots too much may cause the dots to become magnetically unstable. For example, a magnetic domain in a BPM system having an aspect ratio of greater than 4:1 may lose single domain behavior, potentially resulting in poor signal quality and/or digital detection errors.

According to some embodiments, dot composites including multiple dots are provided in a BPM servo pattern. Each dot composite corresponds to one readback signal period (or bit length, for data fields in the servo sector). Thus, the fundamental frequency of the readback signal is controlled by the period of the dot composites, rather than the spacing between dots. This approach will also introduce some higher order harmonics into the readback signal, resulting in high-frequency ripple in the readback signal. According to some embodiments, an analog filter may be used to remove the high-frequency ripple from the readback signal. Such filters are usually already present in the analog front end circuitry of the servo demodulator, and can be appropriately tuned to suppress the ripple.

A BPM servo pattern arrangement and servo demodulator according to some embodiments provide certain benefits. For example, the servo pattern frequency can be easily decoupled from the data frequency, making it possible to lower the servo frequency to accommodate the capabilities of the demodulator. This may be more important as the dot density or the disk revolution speed (RPM) is increased. Furthermore, the signal amplitude of the readback signal may be increased, thereby increasing the effective SNR.

Furthermore, with a BPM dot pattern according to some embodiments, there may be less need to elongate the dots in order to reduce the servo frequency, even in the digital data fields (although dots may be slightly elongated for other purposes, such as increasing the amplitude of the readback signal). Therefore, the problem of a large dot aspect ratio may not be encountered. Patterns according to some embodiments may be more resilient to process and or manufacturing errors, such as random size/position jitters, missing dots, etc., because multiple dots are used per signal period. Furthermore, to implement a system/method according to some embodiments, no major change to current servo channel circuitry design may be required.

Figure 3A:
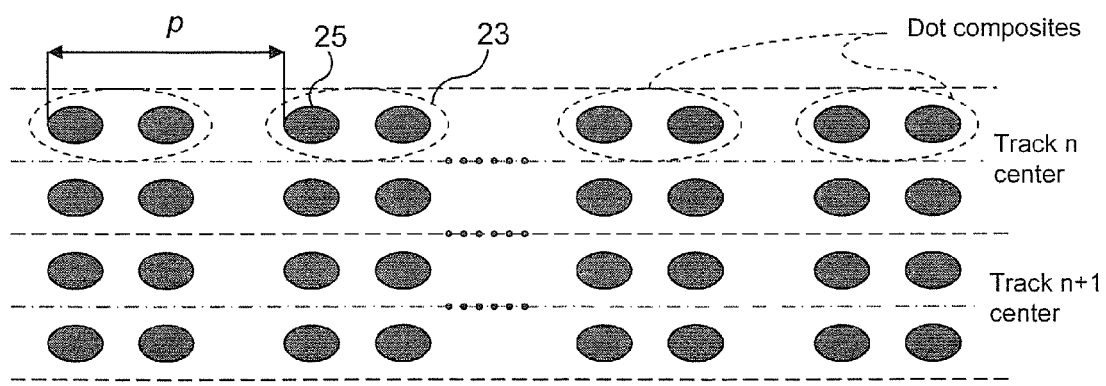
FIGS. 3A, 3B, 3C and 3D illustrate BPM patterns according to some embodiments.

The preamble and burst compounds of a servo field usually correspond to signals with a single dominant frequency as the head travels in the downtrack direction. According to some embodiments, a set of dots of aligned in the downtrack direction, i.e. a dot composite, is provided. The dot composite repeats periodically in the downtrack direction, so that multiple dots are encountered in each readback signal period. For example, FIG. 3A illustrates a pattern for the preamble of the servo field with two dots 25 per dot composite 23, corresponding to two dots per readback signal period. The resulting readback signal will be partially amplitude modulated with ripples in one half of the signal cycle. These ripples are composed of higher order harmonics that can be removed or suppressed with an appropriate filter, as discussed in more detail below.

Figure 1C:
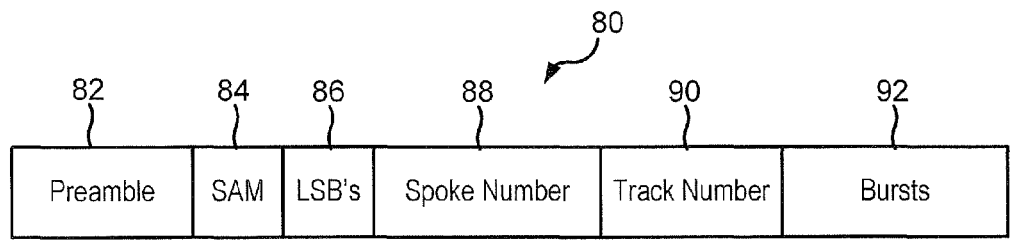
FIG. 1C illustrates exemplary servo control data that may be stored in at least some of the servo spokes of a disk drive.
Figure 1D:
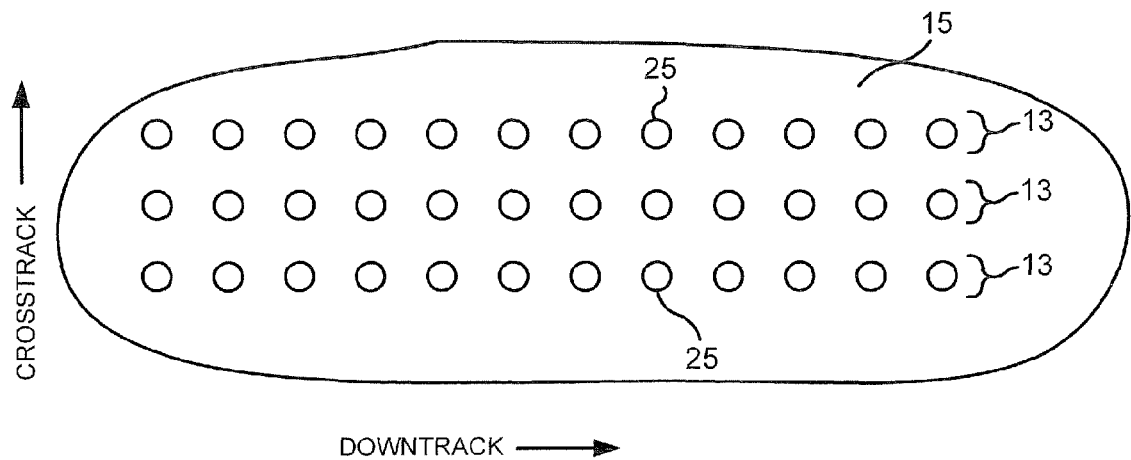
FIG. 1D illustrates a bit patterned media (BPM) configuration including a regular array of patterned bits on a magnetic recording layer.
Figure 3B:
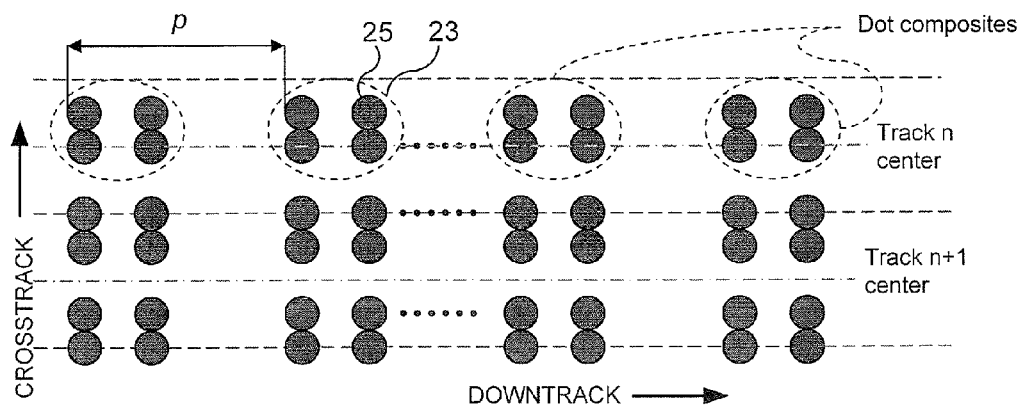
Figure 3C:
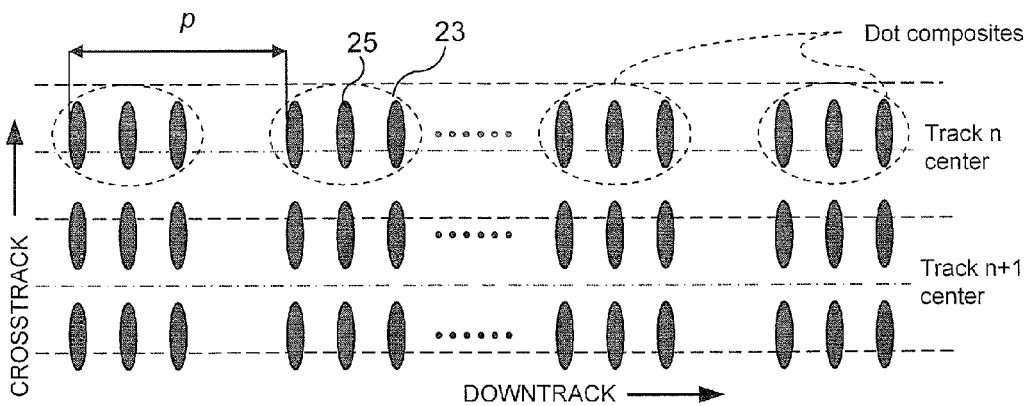

As shown in FIG. 1C, a servo pattern typically starts with the preamble pattern 82. The readback signal generated from the preamble is generally a monotone signal that can be used to extract timing information. According to some embodiments, dot composites including a plurality of dots are aligned in the downtrack direction with a periodicity of p. The choice of p is dependent on the desired fundamental frequency of the readback signal. This arrangement can be used for each of the tracks (and sub tracks) on the disc. FIGS. 3B and 3C show examples of preamble patterns with multiple dots per readback signal period with a periodicity of p. For example, FIG. 3B illustrates a preamble pattern with dot composites 23 including dots 25 offset in both the downtrack and crosstrack directions. That is, each dot composite 23 illustrated in FIG. 3B includes two pairs of two dots each. Each dot pair includes two dots aligned in the crosstrack direction, and the dot pairs are offset from one another in the downtrack direction.

FIG. 3C illustrates a preamble pattern having three dots 25 per readback signal period, wherein the dots 25 are slightly elongated in the crosstrack direction. In addition to increasing amplitude of the readback signal, elongating the dots in the crosstrack direction as in FIG. 3C, and/or providing dots offset in the crosstrack direction as in FIG. 3B may have the advantages of helping to increase the signal quality and/or reducing the amplitude variation in the cross track direction.

Figure 3D:
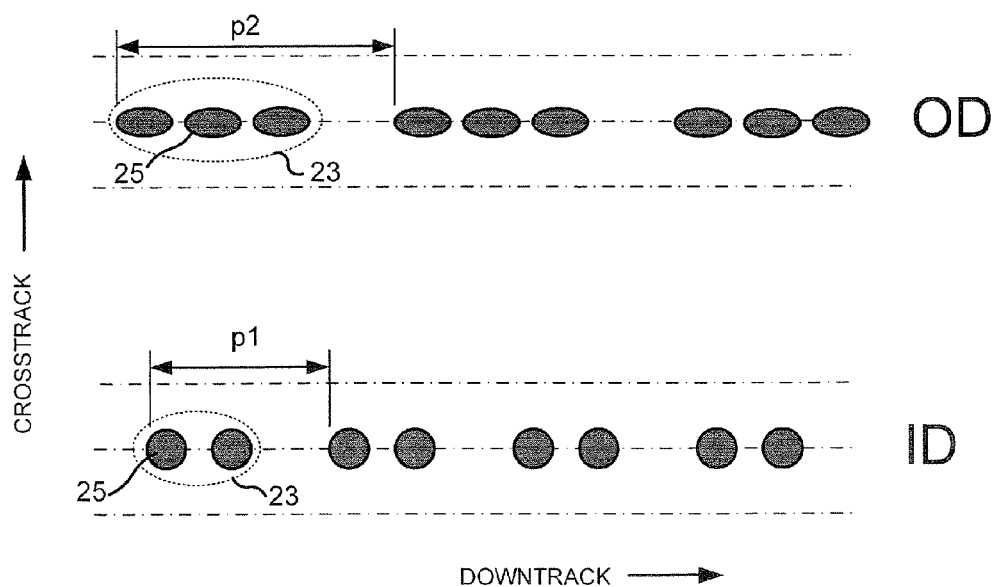

FIG. 3D illustrates a BPM pattern in which the pitch of dot composites 23 varies in the cross track direction. In particular, in order to help maintain a constant servo frequency across the radius of the disc, the pitch of the dot composites 23 may be increased from the inner diameter (ID) to the outer diameter (OD). In the example illustrated in FIG. 3D, dot composites 23 at the ID include two dots 25 per dot composite 23, with the dots 25 having an aspect ratio of 1 (i.e. circular dots). The dot composites 23 at the ID have a first pitch p1. At the outer diameter, the dot composites 23 have a second pitch p2 that is larger than the first pitch p1. To increase the pitch, the dot aspect ratio may be increased, the number of dots may be increased, and/or the spacing between dots in a dot composite may be increased. The pitch between dot composites 23 may be changed in a linear or quasi-linear fashion from the inner diameter to the outer diameter using one or more of these techniques.

The amplitude and/or phase of a readback signal corresponding to a servo burst may change in response to movement of the read/write head away from the center of the track. However, for a given off-track position, the readback signal has a constant fundamental frequency. According to some embodiments, dot composites are arranged to be aligned in the downtrack direction with a certain periodicity p. The alignment of dots in the crosstrack direction may be changed according to a predetermined pattern, so that the amplitude and/or phase of the readback signal may change with off-track position.

Figure 4A:
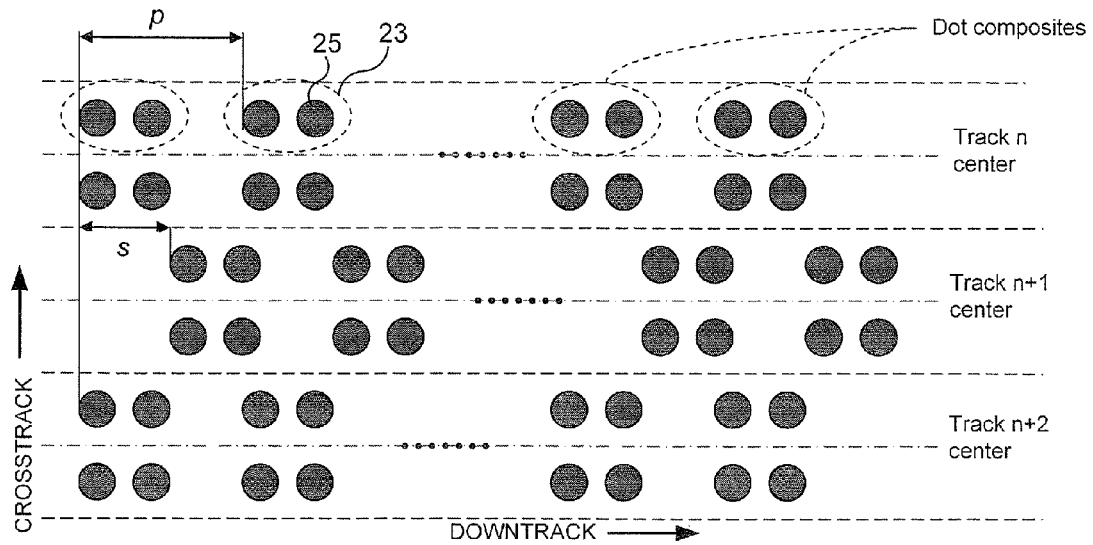
FIGS. 4A, 4B, and 4C illustrate BPM patterns according to some embodiments.
Figure 4B:
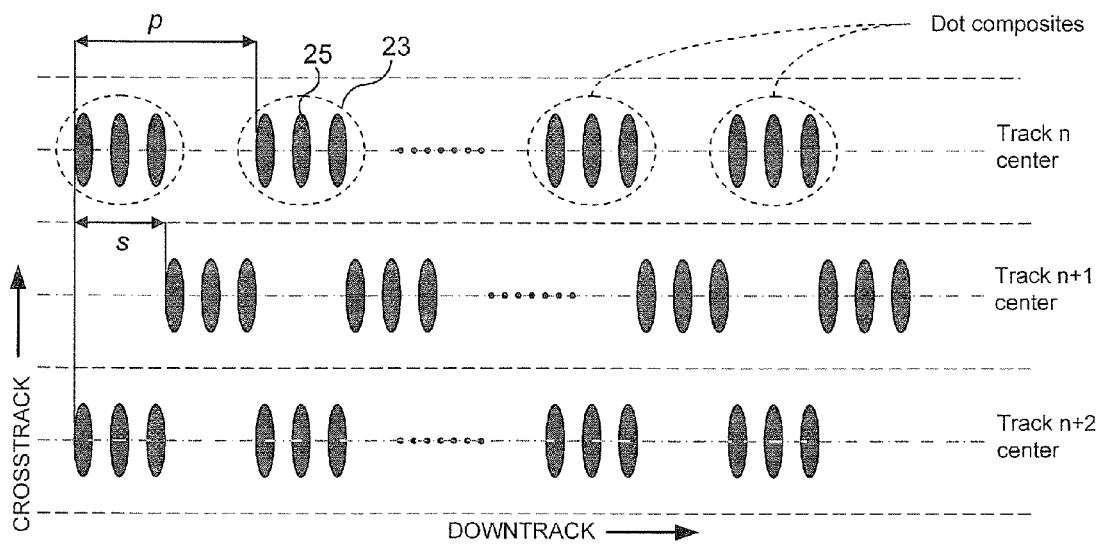
Figure 4C:
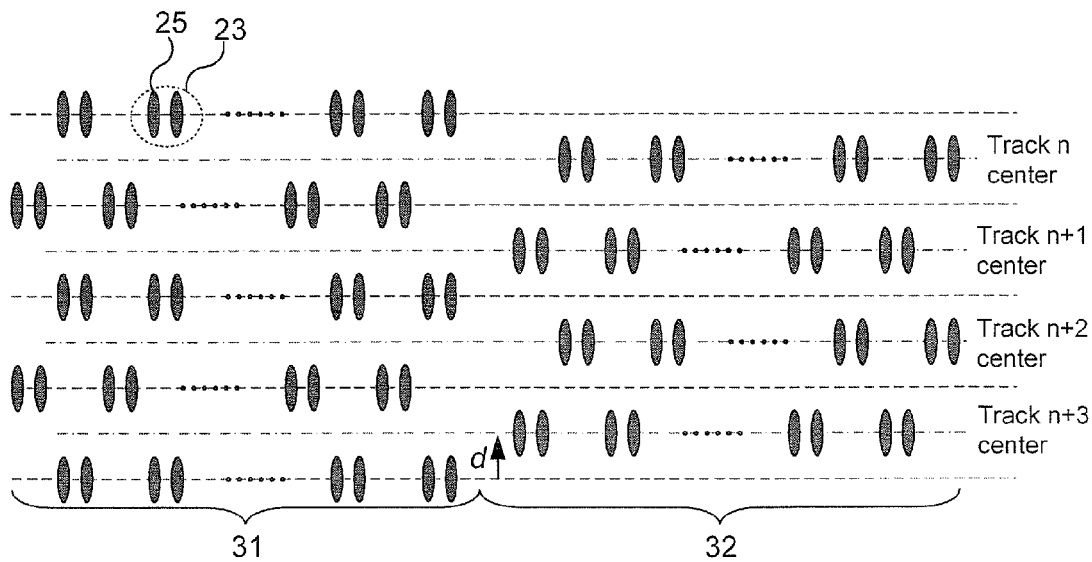

In some embodiments, more than one single burst pattern (with different alignment of the dots with respect to the tracks) can be put side to side in the downtrack direction to form a multiple burst pattern. FIGS. 4A to 4C illustrate examples of burst patterns having multiple dots per readback signal period, with periodicity p, and dots 25 in adjacent tracks shifted by an offset s in the downtrack direction, so that a phase of the dot composites varies in a cross-track direction. For example, FIG. 4A illustrates a burst pattern including two dots 25 per readback signal period, and FIG. 4B illustrates a burst pattern including three dots 25 per readback signal period.

FIG. 4C illustrates a two burst pattern with two dots 25 per readback signal period, in which a first burst pattern 31 is shifted in the crosstrack direction by a distance d relative to an adjacent burst pattern 32. In the example shown in FIG. 4C, the distance d is half of a track width.

Figure 5:
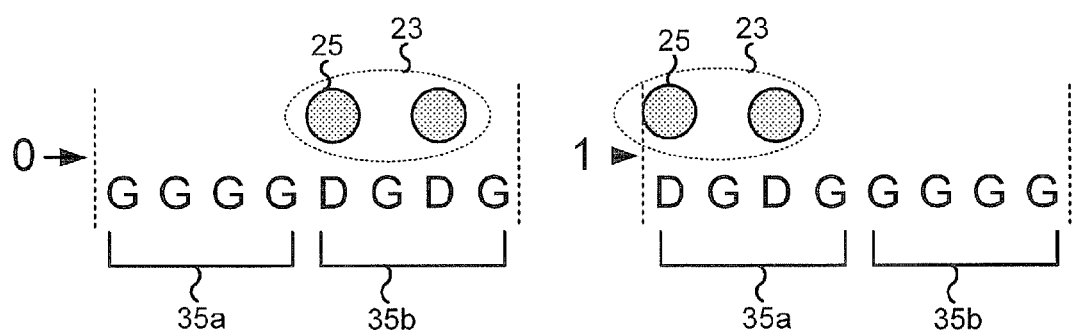
FIGS. 5, 6A and 6B illustrate BPM patterns in servo data fields according to some embodiments.

Some servo fields, such as the SAM, track ID (gray code) servo fields, contain binary information that is used in the servo control loop. In the readback signal, a '1' bit can be represented by either a high to low transition or a low to high transition, and a '0' bit can be represented by the opposite transition. Thus, a readback signal over several cycles will represent a stream of binary bits. In terms of a dot pattern, a '1' can be represented by an area of no dots followed by a series of dots (i.e., a dot composite), or a dot composite followed by an area of no dots. FIG. 5 illustrates a possible encoding pattern for binary data in a BPM servo field. In FIG. 5, dots are indicated by 'D', while spaces, or gaps, where no dot is present are indicated by 'G.' As shown in FIG. 5, a binary '0' can be represented by a an 8-bit pattern including four leading dot positions 35a containing four gaps G, and four trailing dot positions 35b including a dot composite 23 having a dot-gap-dot-gap pattern. A binary '1' can be represented by a pattern in which the four leading dot positions 35a have dot composite 23 having a dot-gap-dot-gap pattern, while the four trailing dot positions 35b have four gaps.

Although FIG. 5 illustrates a possible 8-dot size BPM encoding pattern, it will be appreciated that many other 8-dot size patterns are possible, and patterns having other dot lengths are possible. In the patterns illustrated in FIG. 5, the encoded bits each end with a gap, so that no encoded series of servo data bits can have two consecutive dots. Furthermore, the servo bit pattern illustrated in FIG. 5 includes four leading dot positions 35a and four trailing dot positions 35b. Dots of the dot pattern indicative of a data zero are located only within the trailing dot positions 35b, while dots of the dot pattern indicative of a data one are located only within the leading dot positions 35a. It will be appreciated that in some embodiments, dots of the dot pattern indicative of a data zero may be located only within the leading dot positions 35a, while dots of the dot pattern indicative of a data one may be located only within the trailing dot positions 35b.

The 8-dot size pattern illustrated in FIG. 5 can provide some additional benefits in servo control system. Assuming that there are four samples per bit length, the servo pattern frequency can be reduced by a factor of 4 compared to standard wide bi-phase encoding. That is, the servo sampling frequency can be reduced to a frequency that is one-half of the frequency of data stored on the recordable medium. In general, in a servo controlled data storage system, it may be desirable for the servo frequency to be lower than the data frequency, which can increase reliability of the servo control system. In particular, it may be beneficial to perform servo control at a lower frequency than the data frequency, because estimates of off-track location of a read/write head can be more accurate when the signal quality of the servo control signal is better. Furthermore, electronic elements, such as filters, amplifiers, etc., in the servo control loop can operate better and/or more efficiently at frequencies that are lower than the data frequency in a high-storage density device.

Figure 6A:
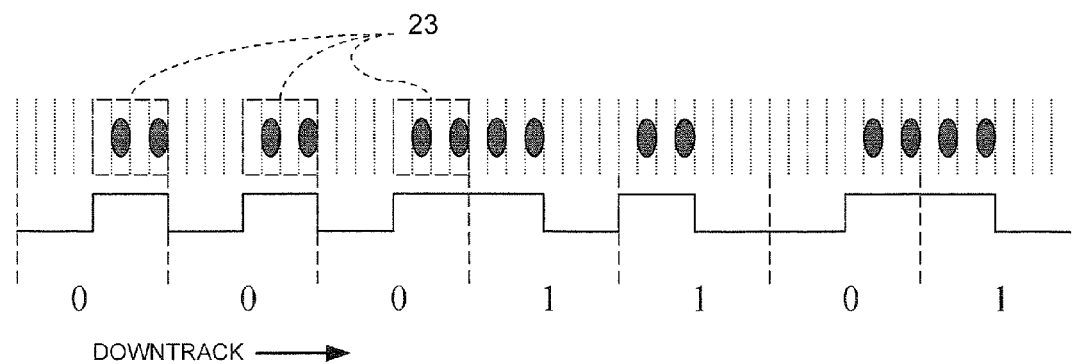
Figure 6B:
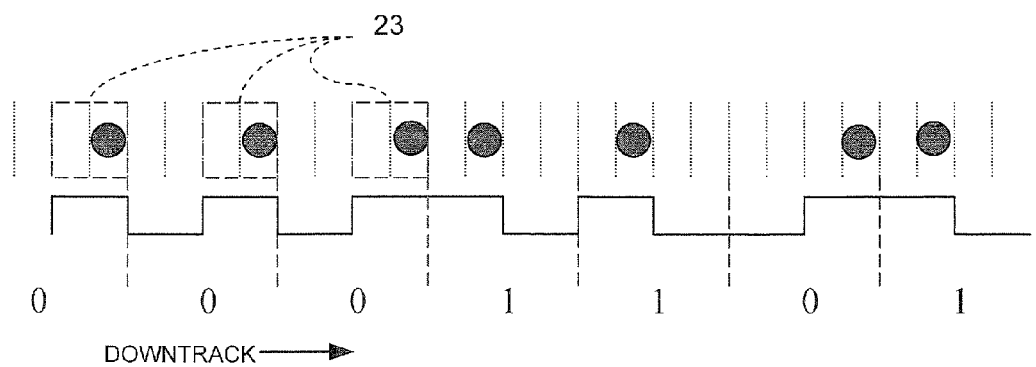

A stream of binary bits can be encoded in BPM by placing the dot patterns corresponding to the ones and zeros sequentially in a downtrack direction, as illustrated in FIG. 6A, which shows a dot pattern encoding the bit sequence '0001101.' Similarly, FIG. 6B illustrates a dot pattern encoding the bit sequence '0001101' in which each dot composite comprises a space followed by one dot for each positive half cycle and two spaces for the negative half cycle.

Figure 7A:
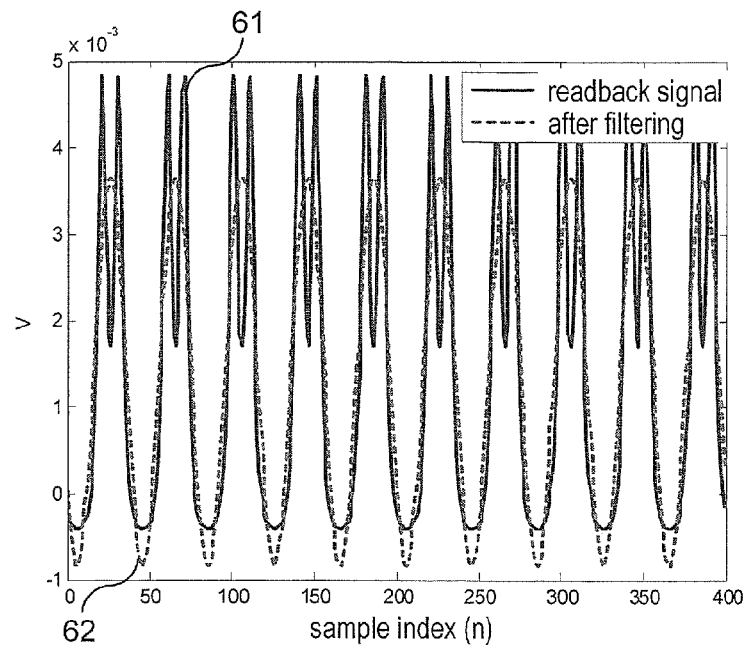
FIGS. 7A, 7B and 7C illustrate raw and filtered readback signals according to some embodiments.
Figure 7B:
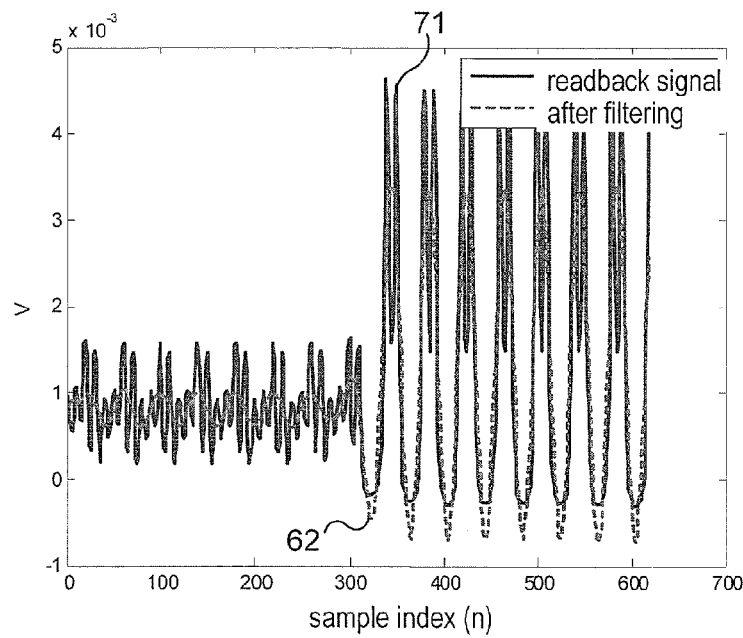
Figure 7C:
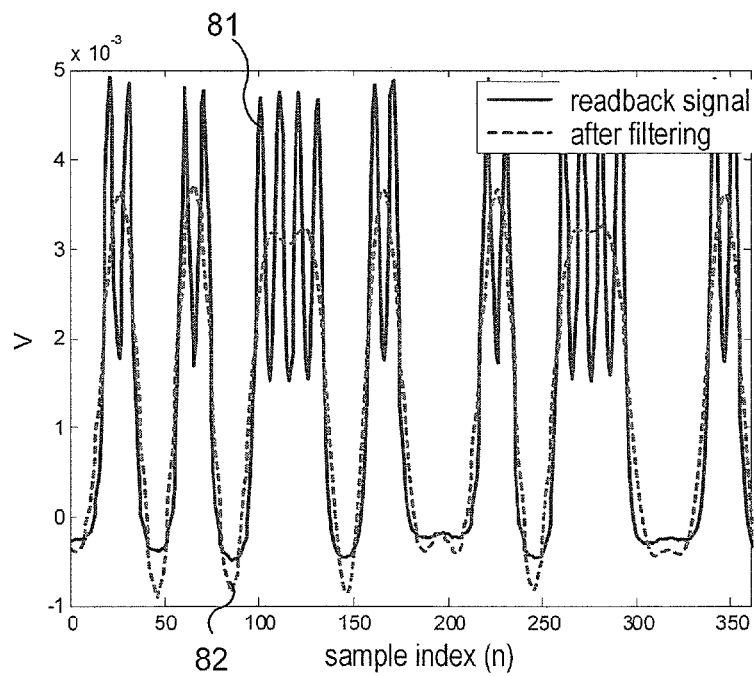
Figure 9:
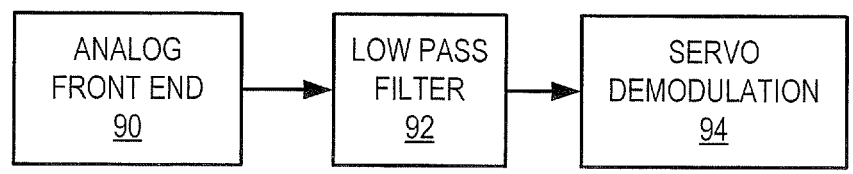
FIG. 9 is a block diagram illustrating portions of a servo controller according to some embodiments.

When using multiple dots per readback signal cycle, or bit length, and DC erase magnetization, the readback signal will be amplitude modulated with ripples in one half of the signal cycle. These ripples include harmonics of the fundamental frequency, having frequencies that are multiples of the fundamental frequency. These ripples can be selectively attenuated using a low pass filter having a cutoff frequency that is less than the ripple frequency but higher than the fundamental frequency of the readback signal. FIGS. 7A to 7C show the readback signals servo patterns according to some embodiments having two dots per cycle (or bit length) as shown in FIG. 3, for example. Also shown in each figure is the output of a low pass filter with a cutoff frequency set at 2.5 times the desired fundamental servo frequency. Since the spectral components of the ripples are at frequencies higher than the cutoff frequency, this filter significantly suppresses the ripples. The resultant waveform can then be used for servo demodulation, as shown in FIG. 9. In some embodiments, the analog front end of the servo control circuitry can be tuned to satisfy the low pass cutoff requirements with minimal impact on other demodulation components.

FIG. 7A illustrates a readback signal 61 corresponding to the preamble pattern shown in FIG. 3b and a filtered readback signal 62 that has filtered to remove the ripples. FIG. 7B shows a readback signal 71 corresponding to the burst pattern of FIG. 4C at the track center and a corresponding filtered readback signal 72. FIG. 7C illustrates a readback signal 81 corresponding to the bit sequence (000110010) encoded using the pattern illustrated in FIG. 5 and having two dots per bit length, and a filtered readback signal 82.

Figure 8:
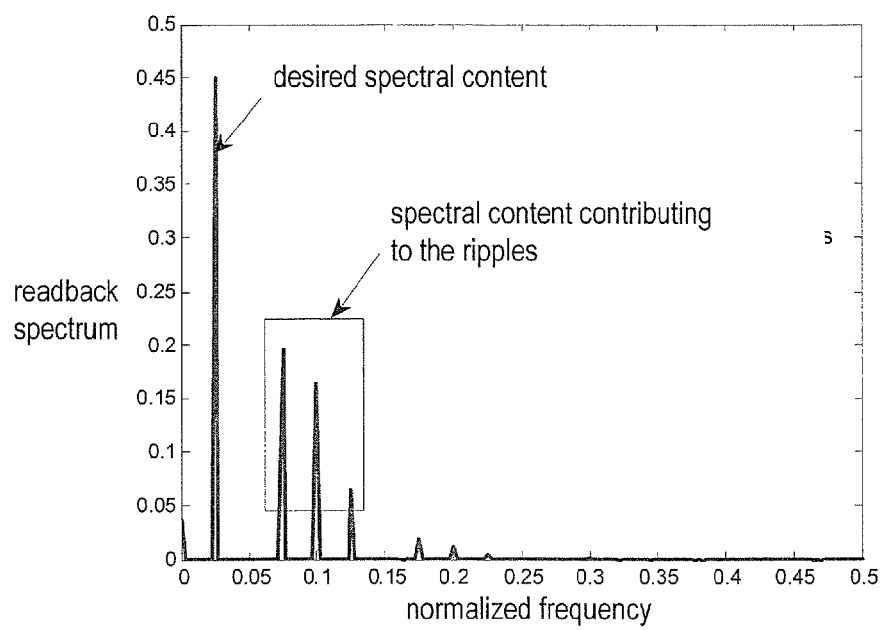
FIG. 8 illustrates a frequency spectrum of a portion of a readback signal according to some embodiments.

FIG. 8 illustrates the frequency spectrum of a portion of the readback signal. As shown therein, the spectral content contributing to the ripples occurs at harmonic frequencies that are integral multiples of the fundamental frequency of the readback signal.

FIG. 9 is a block diagram illustrating operation of portions of a servo controller according to some embodiments. As shown therein, an analog front end 90 generates a readback signal in response to dots in a BPM patterned media passing adjacent a read/write head in a disk drive. The readback signal is filtered by a low pass filter 92 having a cutoff frequency selected to pass the fundamental frequency of the readback signal and to attenuate higher frequency harmonics of the fundamental frequency. The filtered signal is then passed to the servo demodulation unit 94, which demodulates the servo signal.

Figure 10:
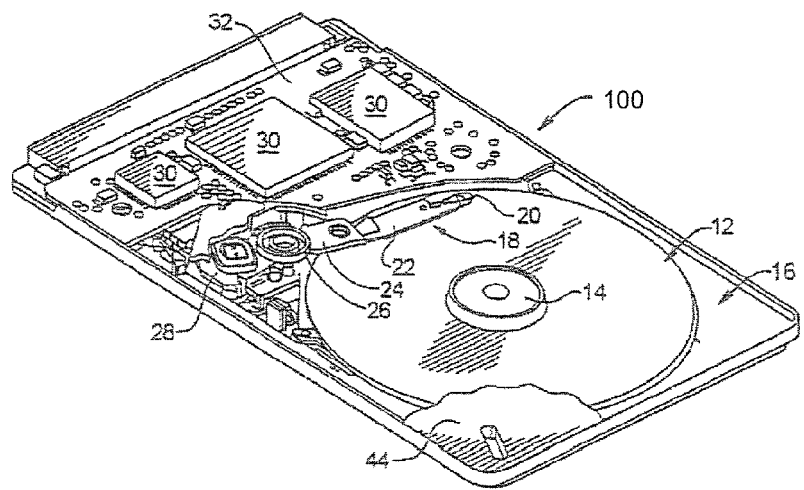
FIG. 10 is a simplified diagrammatic view of a disk drive according to some embodiments.

A simplified diagrammatic representation of a disk drive, generally designated as 100, is illustrated in FIG. 10. The disk drive 100 includes a disk stack 12 (illustrated as a single disk in FIG. 10) that is rotated about a hub 14 by a spindle motor mounted to a base plate 16. The disk stack 12 includes a plurality of disks. An actuator arm assembly 18 is also mounted to the base plate 16. The disk drive 100 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 100.

The actuator arm assembly 18 includes one or more read/write heads (or transducers) 20 mounted to a flexure arm 22 which is attached to an actuator arm 24 that can rotate about a pivot bearing assembly 26. The transducers 20 may, for example, include a magnetoresistive (MR) element and/or a thin film inductive (TFI) element. The actuator arm assembly 18 also includes a voice coil motor (VCM) 28 which radially moves the transducers 20 across the disk stack 12. The spindle motor 15 and actuator arm assembly 18 are coupled to a controller, read/write channel circuits, and other associated electronic circuits 30 which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 11:
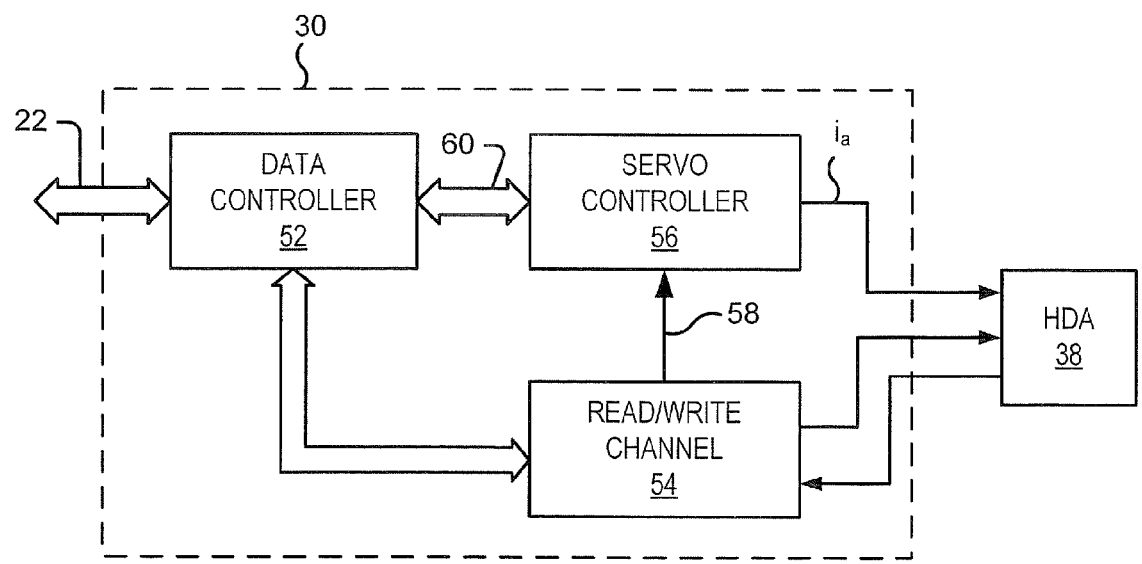
FIG. 11 is a block diagram illustrating drive electronics of a disk drive according to some embodiments.

FIG. 11 is a block diagram of a portion of the drive electronics 30 of the disk drive 100 shown in FIG. 10 that is communicatively connected to a host device. The drive electronics 30 can include a data controller 52, a servo controller 56, and a read write channel 54. Although the controllers 52 and 56, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 38 can include a plurality of the disks 34, a plurality of the transducers 20 mounted to the actuator arm assembly 22 and positioned adjacent to different data storage surfaces of the disks 34, the VCM 28, and the spindle motor.

A data transfer to/from the disk drive 100 may involve, for example, a DMA transfer of data from a host memory onto a system bus. Data from the system bus are transferred onto an I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 20. For the transfer from the CPU to the HDA 38, the read/write channel 54 converts the data to an analog form suitable for writing by the transducers 20 to the HDA 38. The read/write channel 54 also provides servo positional information read from the HDA 38 to the servo controller 56 on lines 58. For example, the concentric data tracks 40 on the storage surface 36 of a data storage disk 34 can be broken up and divided into segments by a multiplicity of regularly spaced apart embedded servo sectors. Each servo sector can include transducer location information such as a track identification field and data block address, for identifying the track and data block, and burst fields to provide fine servo location information. The transducer location information can be used to detect the location of the transducers 20 in relation to that track and data block within the track. The transducer location information is induced into the transducers 20, converted from analog signals to digital data in the read/write channel 54, and transferred to the servo controller 56. The servo controller 56 can use the transducer location information for performing seeking and track following operations of the transducers 20 over the disk tracks 40.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A recordable medium, comprising:
a servo control field comprising a bit patterned media (BPM) pattern including a plurality of dots arranged in a down-track orientation and in a cross-track orientation, wherein the dots comprise a plurality of dot composites, each of the dot composites including a plurality of dots, and wherein a first spacing between adjacent ones of the plurality of dots in a dot composite in the down-track direction is less than a second spacing between adjacent ones of the plurality of dot composites in the down-track direction.

2. The recordable medium of claim 1, wherein a phase of dots arranged on the medium in the servo control field varies in a cross-track direction.

3. The recordable medium of claim 1, wherein the dots arranged on the medium comprise a plurality of dot composites arranged in the down-track direction, and wherein the dot composites include dots offset in the cross-track direction.

4. The recordable medium of claim 1, wherein adjacent rows of dots in the crosstrack direction are offset in the down-track direction.

5. The recordable medium of claim 1, wherein the dots arranged on the medium comprise a first burst that is aligned with a track centerline and a second burst that is adjacent to the first burst in the downtrack direction and that is offset in the cross-track direction from the track centerline.

6. The recordable medium of claim 1, wherein the dots are elongated in the cross-track direction.

7. The recordable medium of claim 1, the dots have a non-unity aspect ratio in the cross-track or the down-track direction.

8. The recordable medium of claim 1, wherein each dot composite comprises dots offset in the cross-track direction and in the down-track direction.

9. The recordable medium of claim 1, wherein the recordable medium comprises a magnetic disc having an inner diameter and an outer diameter, wherein a first pitch of the dot composites at the inner diameter is less than a second pitch of the dot composites at the outer diameter.

10. The recordable medium of claim 1, wherein the recordable medium comprises a magnetic disc having an inner diameter and an outer diameter, wherein a first width of the dot composites at the inner diameter is less than a second width of the dot composites at the outer diameter.

11. The recordable medium of claim 1, wherein the recordable medium comprises a magnetic disc having an inner diameter and an outer diameter, wherein a first number of dots per dot composite at the inner diameter is less than a second number of dots per dot composite at the outer diameter.

12. A servo control system, comprising:
a recordable medium comprising a servo control field comprising a bit-patterned media (BPM) pattern, the BPM pattern including a plurality of dots arranged in a down-track direction in a cross-track direction, wherein the dots comprise a plurality of dot composites, each of the dot composites including a plurality of dots, wherein a first spacing between adjacent ones of the plurality of dots in a dot composite in the down-track direction is less than a second spacing between adjacent ones of the plurality of dot composites in the down-track direction;
a transducer that generates a readback signal in response to a magnetic field generated by the dot composites; and
a controller that controls a position of the transducer in response to the readback signal.

13. The servo control system of claim 12, wherein a pitch between adjacent dot composites defines a fundamental frequency of the readback signal, the system further comprising:
a filter that filters the readback signal to attenuate frequencies in the readback signal higher than the fundamental frequency of the readback signal.

14. The servo control system of claim 12, wherein the dots arranged on the medium comprise a plurality of dot composites arranged in the down-track direction, and wherein the dot composites include dots offset in the cross-track direction.

15. The servo control system of claim 12, wherein adjacent rows of dots in the crosstrack direction are offset in the down-track direction.

16. The servo control system of claim 12, wherein the dots arranged on the medium comprise a first burst that is aligned with a track centerline and a second burst that is adjacent to the first burst in the downtrack direction and that is offset in the cross-track direction from the track centerline.

17. The servo control system of claim 12, wherein the dots are elongated in the cross-track direction.

18. The servo control system of claim 12, wherein the recordable medium comprises a magnetic disc having an inner diameter and an outer diameter, wherein a first pitch of the dot composites at the inner diameter is less than a second pitch of the dot composites at the outer diameter.

19. The servo control system of claim 12, wherein the recordable medium comprises a magnetic disc having an inner diameter and an outer diameter, wherein a first width of the dot composites at the inner diameter is less than a second width of the dot composites at the outer diameter, and/or a first number of dots per dot composite at the inner diameter is less than a second number of dots per dot composite at the outer diameter.

20. A method of demodulating a readback signal, comprising:
generating the readback signal in response to a servo control field on a recordable medium comprising a bit-patterned media (BPM) pattern including a plurality of dots arranged in a down-track direction in a cross-track direction, wherein the dots comprise a plurality of dot composites, each of the dot composites including a plurality of dots, wherein a first spacing between adjacent ones of the plurality of dots in a dot composite in the down-track direction is less than a second spacing between adjacent ones of the plurality of dot composites in the down-track direction; and
filtering the readback signal to attenuate frequencies in the readback signal higher than a fundamental frequency of the readback signal.

* * * * *